United States Patent [19]

Hopper

[11] 4,137,694
[45] Feb. 6, 1979

[54] FILAMENT CUTTER ATTACHMENT

[76] Inventor: Gene A. Hopper, R. #7, 178 Island Rd., Fort Myers, Fla. 33905

[21] Appl. No.: 824,555

[22] Filed: Aug. 15, 1977

Related U.S. Application Data

[63] Continuation-in-part of Ser. No. 745,105, Nov. 26, 1976, abandoned.

[51] Int. Cl.² ............... A01D 55/18; A01G 3/06; B27B 27/00
[52] U.S. Cl. ..................... 56/12.7; 30/276; 56/256
[58] Field of Search ............ 56/12.7, 17.5, 295, 56/256; 30/276, 347

[56] References Cited

U.S. PATENT DOCUMENTS

| | | | |
|---|---|---|---|
| 4,024,635 | 5/1977 | Mizuno et al. | 56/12.7 |
| 4,043,103 | 8/1977 | Lakin | 56/12.7 |
| 4,068,377 | 1/1978 | Kimmel et al. | 56/12.7 |

Primary Examiner—Jay N. Eskovitz
Attorney, Agent, or Firm—William A. Newton

[57] ABSTRACT

A rotary filament attachment to replace the rigid steel cutter blade on a conventional grass edger device, the attachment comprising a pair of disc members, having central openings and opposed inwardly directed peripheral flange portions or projections to define an annular cavity therebetween for storage of a filament line supply when the discs are installed through the central openings on the drive spindle of the edger. A plurality of locking catches or holes are provided in the disc flanges or projections for extension therethrough of end cutting lengths of filament from the respective end portions of the filament line supply when the discs are bolted on the drive spindle.

22 Claims, 7 Drawing Figures

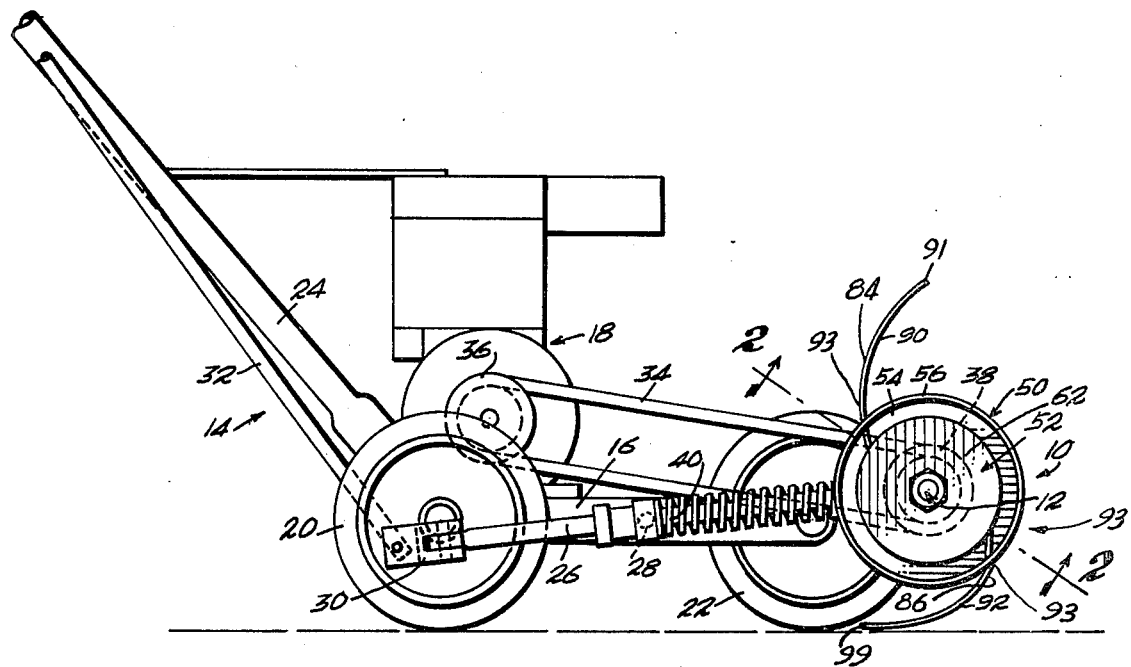
FIG. 1
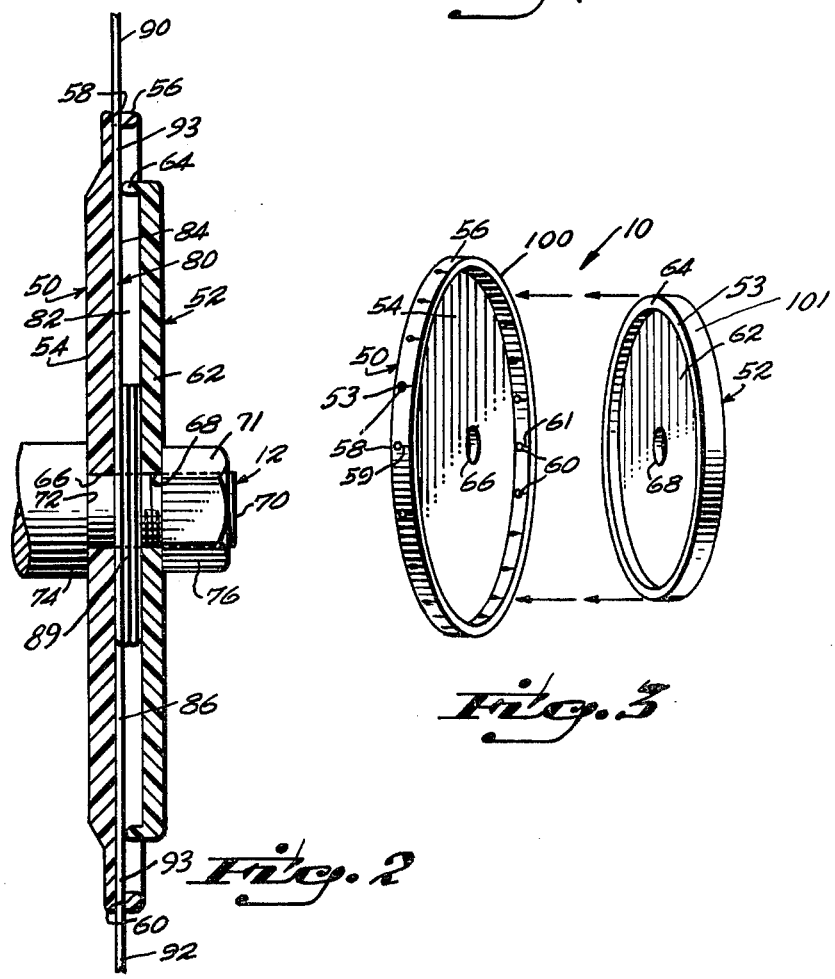
FIG. 2
FIG. 3

FILAMENT CUTTER ATTACHMENT

RELATED APPLICATIONS

This is a continuation-in-part application of Ser. No. 745,105, filed Nov. 26, 1976 and abandoned.

FIELD OF THE INVENTION

The present invention pertains to a rotary cutter and trimmer device, and more particularly to a device of this nature which is adapted to replace the solid steel cutter blades on conventional grass edger devices.

BACKGROUND OF THE PRESENT INVENTION

Filament cutter and edging devices have become quite well known in recent years. These devices are generally in a portable form which are hand held and are provided with electric drive motors which necessitate the use of long electric extension conduits. By their very nature, the in use positioning of these devices in both horizontal and vertical planes is completely dependent upon the hand control exercised by the user who must at the same time maintain a constant control of the long electric conduit while also being aware of his or her safety relative to the cutter filament.

Examples of the patents relating to cutter and trimmer devices of the above described nature are U.S. Pat. Nos. 3,831,278 to Harry M. Voglesonger, 3,928,911 to Charles B. Pittinger Jr., 3,708,967 to Thomas N. Geist and George C. Ballas, French Pat. No. 1.281.450 to M. Naveau.

SUMMARY

The present invention is directed toward an attachment for cutting and trimming vegetation for use in combination with a power edger having a drive spindle and a removable cutter blade driven by the drive spindle. The attachment is adapted for fixed engagement of the drive spindle after the metal cutter blade has been removed from the same. The attachment comprises inner and outer annular members having through holes for fitted engagement with the drive spindle. At least one length of filament line is centrally attached interiorly to the inner and outer annular members with the portion of the filament line extending outward from the attachment defining a selected cutting length. The two annular members define a cavity therebetween which provides a storage area for a portion of a filament line which is wound about the drive spindle. A novel locking system is utilized having a plurality of locking structures which permits the winding and unwinding of the filament line so as to provide a desired cutting length. The locking structure detachably secures the filament line at a point intermediate to its attached portion at the drive spindle and the free end of the cutting portion.

A primary object of the present invention is to provide a filament cutter and trimmer attachment to be adapted to a conventional gasoline powered edger, allowing the user of the same to incorporate all of the advantages of both the gasoline engine powered edger and the filament cutter.

A related object of the present invention is to provide a filament cutter and trimmer attachment which can readily be secured to a conventional powered edger which has a removable metal cutter blade.

Another related object of the present invention is to provide a filament cutter and trimmer attachment which can be utilized in combination with a power edger, giving the operator the option of using the filament attachment of the present invention or the original rigid metal blade.

Another very important object of the present invention is to provide a filament cutter and trimmer attachment which has a novel locking structure for the filament line.

A related object of the present invention is to provide a filament cutter and trimmer attachment which allows for the winding and unwinding of the filament line so as to provide the desired cutting length.

A related object of the present invention is to provide filament line which may be adjusted to be secured to any one of a plurality of locking structures, thereby varying the position of the extending filament along the periphery of the attachment.

Another related object of the present invention is to provide a filament cutter and trimming attachment in which the filament line upon being transferred from one locking structure to the next, winds or unwinds the same so as to allow for a variable cutting length of the filament line.

A related object of the present invention is to provide a filament cutter and trimmer attachment with a locking structure comprising a clamp, so that the filament line can be easily and readily detached from one clamp and transferred to another clamp, achieving the desired results of extending or retracting the cutting length of the filament line while having the line being securely locked into place during operation of the edger.

A more detailed object of the present invention is to provide an edger utilizing a filament line with the edger having wheels to make the same mobile and supported on the ground.

Yet another detailed object of the present invention is to provide an edger utilizing a filament cutter in which the operator is in a safe position behind the edger device and can not accidentally come into contact with the rapidly whirling cutter links of the filament.

Yet another detailed object of the present invention is to provide an edger having a filament cutter so that the flexible cutter filament links will not throw rocks.

Yet another detailed object of the present invention is to provide an edger having a filament cutter and trimmer attachment with a flexible peripheral portion which will deflect if the same engages a solid obstruction.

Yet another detailed object of the present invention is to provide an edger having a filament cutter and trimmer attachment which does not require electric power, and therefore can be used in vacant lots and other similar places.

Yet another detailed object of the present invention is to provide an edger having a filament cutter and trimmer attachment which is mounted on wheels and therefore gives the operator better control of height and distance factors than can be obtained with a hand held filament cutter or trimmer device.

Another very important object of the present invention is to provide a filament cutter and trimmer attachment which is simple and inexpensive so as to lend itself to a low retail cost to owners of conventional edgers, or, alternatively, allowing for its inclusion as an attachment with the sale of conventional edgers.

In summary, one of the principal objects of the present invention is to provide a filament cutter and trimmer attachment as a replacement for the rigid metal blade on conventional grass edgers and to provide locking structures permitting the winding and unwinding of the filament line.

DESCRIPTION OF THE DRAWINGS

Further objects and advantages of the present invention will become apparent as the following description proceeds, taken in conjunction with the accompanying drawings in which:

FIG. 1 is a side elevational view of the filament cutter, trimmer attachment of the present invention, fixed to the drive spindle of a conventional grass edger;

FIG. 2 is a diametric cross sectional view of the first embodiment of the cutter, trimmer attachment taken along line 2—2 of FIG. 1;

FIG. 3 is an exploded view of the pair of lid shaped housing members of the first embodiment of the cutter, trimmer attachment;

DESCRIPTION OF THE PREFERRED EMBODIMENT

Figure 4:
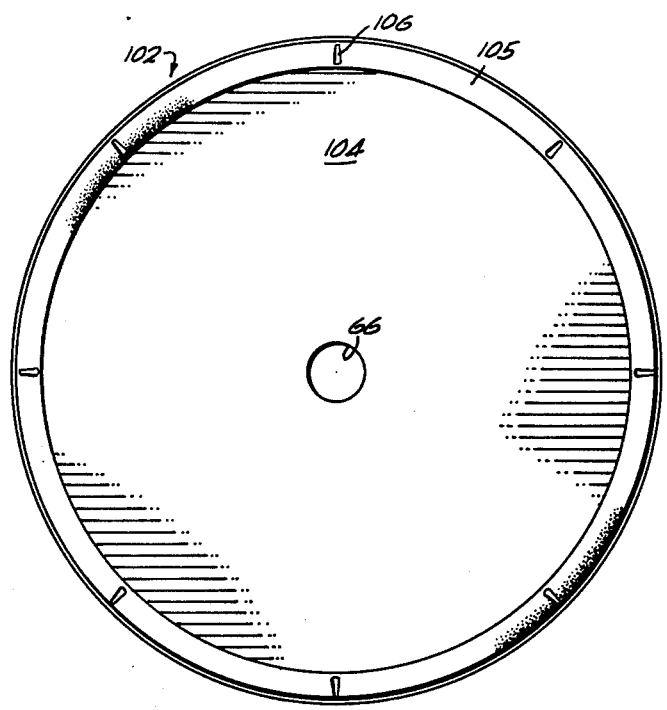
FIG. 4 is a side elevational view of the second embodiment of the filament cutter, trimmer attachment.

With reference to FIG. 1, the filament cutter, trimmer attachment of the present invention, indicated generally as 10, is shown fixed to the drive spindle 12 of a conventional gasoline powered grass edger, generally designated 14. Although primarily designed for a gasoline edger, the present invention is adaptable to any edger having a removable metal cutter blade.

The edger 14 of the preferred embodiment includes support 16 for the gasoline engine 18 and three wheels, two rear wheels, one illustrated at 20, and a front wheel 22, disposed in a central relation to rear wheels 20. A push handle 24, pivotally attached to the engine support 16 is disposed for manual operation of the edger device.

A position control means for the cutter, trimmer means 10 is comprised of a lower rod 26, centrally pivotally attached at 28 to the support 16. Rod 26 is connected by a universal joint 30 to a generally upwardly, rearwardly extending control rod 32. A conventional manually operated clamp means (not shown) is fixed to the push handle 24 for selective clamping or loosening of the control rod 32. When loosened, the control rod 32 is manually operable to selectively position the attachment 10. In operation, the control rod 32 is adapted to pivot lower rod 26 about pivot 28 to raise or lower the attachment 10 to a desired degree. Simultaneously, the control rod 32 may be rotated about its axis to axially adjust the lower rod 26 by means of universal joint 30 to axially rotate the attachment 10 from the generally vertical, edging position to a horizontal, weed or grass cutting position. The above described control means along with its operation are conventional with a typical gasoline powered grass edger and therefore provides the desired flexibility of use for the cutter, trimmer attachment 10 of the present invention.

Drive spindle 12 is driven from the engine 18 by a belt 34 connecting between a motor pulley 36 and a pulley 38 fixed to the drive spindle 12 which is conventionally carried on the forward end of the lower control rod 26.

It should be noted that the pulley 38 and drive spindle 12 are conventionally provided with a spring loaded connection 40 to rod 26, permitting a larger pulley to obtain a faster rotational speed without necessitating the use of a longer belt 34.

Figure 6:
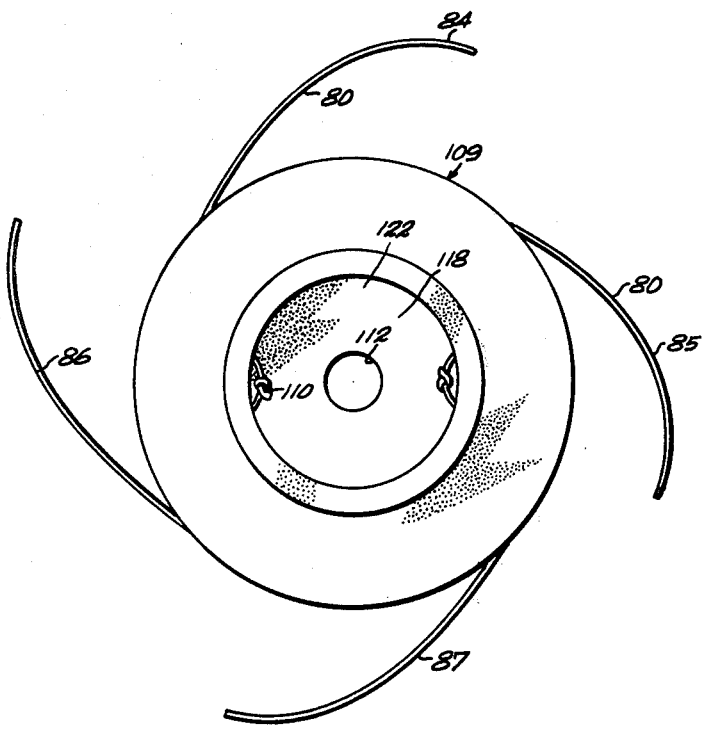
FIG. 6 is a side elevation view of the spool to be used with the cutter, trimmer attachment.
Figure 5:
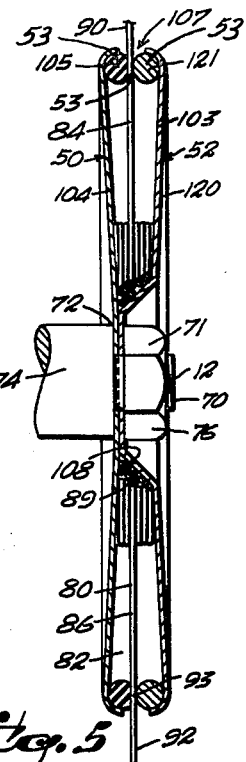
FIG. 5 is a diametric cross-sectional view of the second embodiment of the cutter, trimmer attachment shown in FIG. 4.

There is shown two embodiments of the cutter, trimmer attachment 10 of the present invention, one being shown in FIGS. 2 and 3 and the other in FIGS. 5 and 6. Each embodiment will be described in detail hereinafter. Referring generally to both embodiments, the filament cutter, trimmer attachment of the present invention comprises inner and outer annular member 50 and 52, each having axially aligned through holes for fitted securement over the end portion of the drive spindle 12. Compression means 71 is provided for securing the inner and outer annular member 50 and 52 in compressed relationship relative to each other and for securing the annular member 50 and 52 in a rigid fixed disposition on drive spindle 12. The attachment 10 further includes at least one filament line 80 having a portion 89 centrally attached and having at least one free end 91 opposite the attached portion 89. A plurality of locking means 53 are positioned, ideally, in equally spaced relationship about the periphery of at least one of the annular members 50 and 52. The locking means 53 provide detachable securement for the filament line 80 at a point 93 intermediate to the attached portion 89 and the free end 91. The portion of the filament line 80 extending outwardly from the locking means 53 to the free end 91 defines a selected cutting length 90. The locking means 53 provides intermediate support which helps in the control of the cutting length 90. Additionally, providing a plurality of locking means 53 allows for the adjustment of the filament 80 to be positioned in a plurality of locations about the periphery of the inner and outer annular members 50 and 52. Additionally, a portion of the filament line 80 is wound about the spindle drive 12. In this manner the adjustment of the filament line 80 from one locking means to another winds or unwinds the filament line 80 about the spindle drive 12. In so adjusting the filament line 80, the user can vary the cutting length 90 of the same. The annular members 50 and 52 are disposed in spaced-apart relationship toward their central portions, thereby defining between the same an annular cavity 82 which is utilized for storing the wound filament line 80.

As described above, the present invention can be utilized with a filament having only one free end 91. However, in the preferable construction of the attachment of the present invention, shown in FIG. 1, a single filament line 80 may have a large loose knot centrally formed therein, forming the attachment portion 89. In such a construction there will be opposed free ends 91 and 99 and opposed cutting length 90 and 92. The loose knot is slipped over the outer annular member 52 into the annular cavity 82 and drawn tightly about the stud portion 70, therefore defining opposed filament line portions 84 and 86. Alternatively, the filament line 80 may be wound into a bundle, and, prior to the assembly of the outer annular member 52, slipped over the drive spindle 12. Also it should be appreciated more than one filament line 80 may be included in the applicant's invention, leading to any number of filament line portions.

As previously described, the inner and outer annular members 50 and 52 are provided with respective axially aligned central holes 66 and 68 for a fitted engagement over an outer threaded stud portion 70 of drive spindle 12. The compression means 71 comprises a shoulder 72 and a nut 76. The shoulder 72 is formed from an enlarged hub portion 74 of the drive spindle 12. In assembling the attachment 10 to the drive spindle 12, the inner and outer annular members 50 and 52 are placed on the threaded stud portion 70 and the nut 76 is threaded on the stud 70 and tightened against the outer member 52 as shown in FIG. 2. The inner annular member 50 is disposed in adjacent engagement with the shoulder 72. As shown in FIG. 2 the opposed filament line portions 84 and 86 are then wound about the stud portion 70, after the nut 76 is tightened.

In the first embodiment of the cutter, trimmer attachment 10 shown in FIGS. 2 and 3, inner and outer annular members 50 and 52 comprise lid shape inner and outer members 100 and 101 respectively. The inner member 100 includes a disc shaped main body portion 54 with a peripheral outwardly extending flange 56. The member 100 has integrally formed therein at least one pair of diametrically opposite through holes 58 and 60 integrally formed in the flange 56. Disposed between the edge of flange 56 and the holes 58 and 60 are line feed in slots 59 and 61 respectively. As can be seen in FIG. 3, a plurality of diametrically opposite pairs of through holes 58 and 60 are preferably provided in helping control the cutting length 90 and 92 of the filament line in a manner previously described.

In the first embodiment, the outer smaller member 101 includes a disc shaped main body portion 55 with a peripheral inwardly extending flange 64. As shown in FIG. 2, the opposed filament line portion 84 and 86 are wound about the stud portion 70, after the nut 76 is tightened to frictionally engage the edge of flange 64 of the outer member 101 against the filament line 80. Efficiently long end portions of line portion 84 and 86 are left unwound and are inserted through any pair of diametrically opposed holes 58 and 60. This results in the desired cutting lengths 90 and 92 as illustrated in FIG. 1. When the cutting lengths 90, 92 wear off or are damaged, they may be further extended to the desired length by unwinding additional line from the supply of wound filament 80 in the annular cavity 82.

When nut 76 is tightened flange 64 of smaller outer member 101 is disposed in tight abutting relationship to the opposed area of larger inner member 100. The filament line 80 is clamped between the flange 64 and inner member 100 so as to prevent slippage of the same from the adjacent hole 58 or 60. The clamping of the members 100 and 101 with a single hole 58 or 60 defines a single locking means 53 for the first embodiment.

The thickness of the lid shaped members 100 and 101 of the first embodiment is determined by the material from which they are made. It is preferable to form the outer member 101 from a suitable high impact absorbing plastic material to provide a degree of resiliency to absorb shocks if a solid obstruction is struck during use. However, one or both members 100 or 101 may be formed of a suitable metal material. It should be noted that when an outer member 101 is formed of a resilient material, the central zone of outer member 101 is forced inwardly into contact with the central zone of inner member 100 when nut 76 is tightened on study portion 70. However, if nut 76 is tightened in placed prior to wrapping the supply of filament line 80 in annular chamber 82, the line occupies the space disposed outwardly of the central contact area.

In the second embodiment of the attachment 10, shown in FIGS. 4 and 5, the inner and outer annular members 50 and 52 comprise inner and outer members 102 and 103 respectively. Inner and outer members 102 and 103 include disc portions 104 and 120 respectively and projection portions 105 and 121 respectively, each projection preferably having a curvilinear configuration. Projection portions 105 and 121 are mounted on the outer peripheral regions of the corresponding disc portion 104 and 120 respectively. When the attachment 10 of the second embodiment is assembled, the opposed projection portions 105 and 121 meet in clamping relationship to define a clamp 107. In FIG. 5 showing the preferable design of the second embodiment, the clamp 107 supports and guides the cutting lengths 90 and 92. As shown in FIG. 5, the clamp 107 is accomplished by means of a plurality of integrally formed grooves 106 about the projection portion 105. Each of these grooves 106 is aligned with its longitudinal axis being radially disposed relative to the disc portion 104. In FIG. 5, the projection portion 105 is formed preferably of a rubber material and has ideally eight grooves formed therein. The projection portion 121 of the other disc 120 normally will be formed of a metal, such as steel and will not contain grooves. However, it should be appreciated, that grooves could be integrally formed on projection portion 121 also. Such grooves on projection portion 121 could be cooperatively aligned and positioned to be adjacent to a corresponding groove on projection portion 105 so as to define a single filament line receiving groove. Alternatively, the grooves on one disc 120 could be staggered relative to the grooves on the other disc 104. Likewise, whether or not each disc 104 or 120 has grooves 106, it is contemplated that the projection portions 105 and 121 can be composed of either rubber or metal. Likewise, although eight grooves 106 are shown in FIG. 4, it is contemplated that any number of grooves 106 could be disposed on one or more discs 104 and 120. It is preferable that the grooves 106 are disposed in equi-distant radial spacing about the periphery of the disc 104 or 120 so as to provide uniformity in adjustment of the line filament 80. Generally, a filament line 80 may be clamped within a selected groove 106. The abutting relationship of opposed projection portions 105 and 121 maintains the filament line 80 in its clamped relationship within the groove 106. Hand manipulation of the filament line 80 will allow the same to be disengaged from one groove 106 and placed in another groove 106.

In the preferred embodiment shown in FIGS. 4 and 5, the outer disc 103 has a central spacer portion which is utilized to maintain the opposed disc 102 and 103 in spaced-apart relationship. This spaced-apart relationship of the disc 102 and 103 allows for the winding of the filament line around the spacer portion 108. Otherwise, due to the flexible nature of the disc portions 104 and 120, the central portions of the disc would be compressed inward by nut 76 and not allow sufficient room for winding the filament line 80. Although not shown in the drawings, the spacer portion 108 could also take the form of a resilient washer disposed in surrounding relationship to the drive spindle 12 intermediate the disc portion 104 and 120. In either case, the spaced-apart relationship allows for the absorbing of irregularity of the line when knotted on the drive spindle 12. It should be appreciated that the spacer portion 108 could also be formed on either of the disc 104 or 120.

Preferably, the outer edges of the opposed projection portion 105 and 121 are curvilinear, as previously described, in order to avoid abrasive and cutting contact with the line. As with the first embodiment, movement of the filament line 80 from one groove 106 to the next groove 106 either lengthens or retracts the filament line 80. In this embodiment of the present invention, the locking means 53 is in the form of the clamp 107. The clamp 107 comprises the opposed engaged projection portions 105 and 121 and the associated grooves 106, which when used in combination, clamps the filament line 80.

Figure 7:
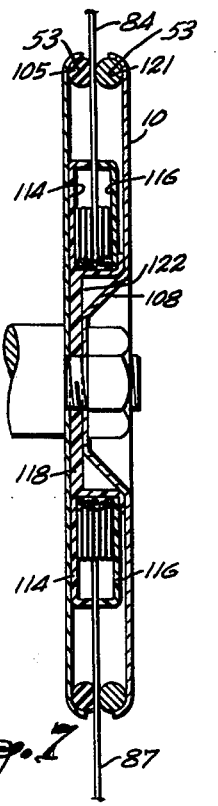
FIG. 7 is a diametric cross-sectional view of the spool shown in FIG. 6 in combination with the attachment of FIG. 5.

Instead of winding the filament line 80 about the spindle 12 in the first and second embodiment of the attachment 10, a spool 109, shown in FIGS. 6 and 7, can be utilized. The spool 109 already has the filament line 80 wound about its center porton 118, which has the advantage of alleviating the user of the same from manually winding the filament line 80 about the spindle. It is contemplated that these spools can be sold as a separate item, and when one spool 109 becomes depleted, another new spool 109 may be substituted in its place. To substitute spools 109, the outer annular member 52 is removed by disengaging the nut 76. Next, the old spool 109 is removed by sliding the same off the spindle 12, with the other new spool 109 being substituted therefor. Finally, the outer annular member 52 is then fittingly secured over the spindle 12. The spool 109 comprises a pair of opposed annular walls 114 and 116 which loosely clamp the protruding filament lengths so as to maintain the filament line 80 in its wound disposition prior to usage. A given filament line 80 may have a knot 110 centrally tied therein to create the two previously described filament lengths 84 and 86. Clearly, a knot tied at the end of filament 80 as opposed to the center of filament 80 would create a single filament length 84. Likewise, as shown in FIG. 6, more than one filament 80 may be utilized. More specifically, referring to FIG. 6, a second filament line 80 is utilized which generates two additional filament lengths 85 and 87. As previously described, in this manner, numerous filament lengths may be created. Ideally, two or four filament lengths appear to give the best performance with a conventional gasoline edger. The filament lengths are then wound about the center portion 118 of the spool 109, such center portion 118 having its outer circumference traversing the opposed annular walls 114 and 116. Centrally located in the central portion 118 is aperture 112 which would be used to slip the spool 109 over the spindle 12. Additionally, the central portion 118 has an indented area 122 for receiving the spacer portion 108 of the outer disc 120 of the second embodiment. As previously mentioned, various combinations of means for creating the spaced-apart relationship of the disc 104 and 120 toward their central regions can be devised. Therefore, the illustration of a spool 109 having an indented area 122 is merely illustrative of a design which can be utilized with the second embodiment of the attachment 10.

In some instances, the blade guard may be removed, as in the FIG. 1 illustration, for use of the attachment 10. However, this is dependent upon circumstances and its intended use. Some gasoline edgers are provided with bolt on guards which may be easily removed and reinstalled.

The length of filament line 80 which is used may be conventional monofilament fishing line, preferably in a range between 125 pounds and 200 pounds test or greater.

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. An attachment for cutting and trimming vegetation for use with a powered edger having a drive spindle and a removable metal cutter blade driven by said drive spindle, said attachment being adapted for fixed engagement on said drive spindle after said metal cutter blade has been removed, said attachment comprising;
   inner and outer annular members having axially aligned through holes for fitted securement over the end portion of said drive spindle,
   compression means for securing said inner and outer annular members in compressed relationship relative to each other,
   at least one length of filament line having a portion centrally attached between said inner and outer annular member and having at least one free end opposite said attached portion,
   a plurality of locking means for detachably securing said filament line at a point intermediate to said attached portion and said free end,
   said locking means disposed in spaced relationship relative to each other about the periphery of said inner and outer annular members,
   said locking means including at least one inwardly facing projection disposed about the periphery of one of said annular members,
   said projection of one said annular member disposed in clamping relationship to the other said annular member to secure said filament line therebetween,
   a portion of said filament line from said locking means to said free end defining a selected cutting length extending outwardly beyond said annular members,
   a portion of said filament line disposed in wound relationship to said drive spindle,
   whereby said filament line may be adjusted to be secured by any one of said plurality of locking means and therefore varying the position of the same along the periphery of said attachment and whereby adjustment of said filament line between said locking means winds and unwinds the same so as to allow for the selection of a specific cutting length.

2. The attachment of claim 1,
   each said locking means including a radially aligned groove integrally formed in said projection for receiving said filament line.

3. The attachment of claim 2,
   said projection composed of rubber.

4. The attachment of claim 1,
   said locking means including a pair of inwardly facing projections, one said projection disposed about the periphery of each of said annular member,
   said projection of one said annular member disposed in clamping relationship to the projection of the other said annular member to secure said filament line therebetween.

5. The attachment of claim 4,
   each said locking means including a radially aligned groove integrally formed on the same said projection.

6. The attachment of claim 5,
   said projection composed of rubber.

7. The attachment of claim 4,
each said locking means including a radially aligned groove integrally formed on one of said projections,
said plurality of locking means disposed on both said projections,
said projection composed of rubber.

8. The attachment of claim 4,
each of said annular members comprising a sheet metal disc with said projection inwardly mounted on the outer periphery of said disc.

9. The attachment of claim 8,
each said projection having a curvilinear surface oppositely disposed from its mounted surface, whereby abrasive cutting engagement of sharp edges with said filament line is avoided.

10. The attachment of claim 1,
spacing means for maintaining said annular members in spaced apart relationship about the central portions of the same,
whereby said spaced apart relationship allows for the storage of said filament line in an annular cavity.

11. The attachment of claim 10,
said spacing means comprising a spacer portion integrally formed on the central region of one of said annular members.

12. The attachment of claim 1,
said drive spindle having a threaded end portion,
said through holes of said inner and outer annular members disposed in screwthreaded engagement with said threaded end portion of said drive spindle.

13. The attachment of claim 12,
said compression means comprising a nut disposed in screwthreaded engagement on said threaded end portion of said drive spindle adjacent the outer annular member,
said compression means further comprising a shoulder defined by an inner enlarged portion of said drive spindle disposed adjacent said inner annular member,
whereby said shoulder and said nut provide the compressed relationship of said inner and outer annular member while securing the same to said drive spindle.

14. The attachment of claim 1,
said filament line attached portion being intermediate to the entire length of said filament line defining first and second lengths, each having a free end opposite said attached portion.

15. The attachment of claim 1,
a spool having a wound bundle of said filament line disposed in fitted engagement over said drive spindle between said inner and outer annular members,
whereby said spool facilitates the easy replacement of worn filament.

16. The attachment of claim 15,
said spool comprising opposed annular walls having said wound bundle of said filament line contained therebetween,
said spool further comprising a center portion interconnecting said opposed annular walls about the inner circumference of the same whereby said filament line may be wound about said center portion.

17. The attachment of claim 14,
a plurality of said filament lines.

18. The attachment of claim 15,
said locking means disposed for locking said first and second lengths of said plurality of filament lines in substantially equidistant radially spaced relationship to each other.

19. The attachment of claim 1,
said power edger comprising a conventional gasoline powered edger having a support for a gasoline engine, wheels for mobility, a push handle and control means to adjust the vertical height and pivotal movement of said cutter blade drive spindle, drivingly connected to a gasoline engine on the support by pulley and belt means.

20. An attachment for cutting and trimming vegetation for use with a powered edger having a drive spindle and a removable metal cutter blade driven by said drive spindle, said attachment being adapted for fixed engagement on said drive spindle after said metal cutter blade has been removed, said attachment comprising;
inner and outer annular members having axially aligned through holes for fitted securement over the end portion of said drive spindle,
compression means for securing said inner and outer annular members in compressed relationship relative to each other,
said inner annular member comprises an inner disc and an outwardly extending peripheral flange therefrom substantially at right angles thereto,
at least one length of filament line having a portion centrally attached between said inner and outer annular members and having at least one free end opposite said attached portion,
a plurality of locking means for detachably securing said filament line at a point intermediate to said attached portion and said free end,
said locking means disposed in spaced relationship relative to each other about the periphery of said inner and outer annular members,
said locking means including at least one pair of diametrically opposite through holes in said inner disc peripheral flange for passage therethrough of the respective cutting lengths,
said locking means further including said outer annular member having an outer disc of a somewhat smaller diameter than said inner disc and an inwardly extending peripheral flange therefrom substantially at right angles thereto to provide a frictional engagement of said filament line inwardly of said cutting lengths between said outer disc peripheral flange and inner disc,
a portion of said filament line disposed in wound relationship to said drive spindle,
a portion of said filament line from said locking means to said free end defining a selected cutting length extending outwardly beyond said annular members,
whereby said filament line may be adjusted to be secured by any one of said plurality of locking means and therefore varying the position of the same along the periphery of said attachment and whereby adjustment of said filament line between said locking means winds and unwinds the same so as to allow for the selection of a specific cutting length.

21. The attachment of claim 20,
a plurality of pairs of diametrically opposite through holes in said inner disc peripheral flange.

22. The attachment as defined in claim 21,
filament line feed in slots connecting between each of said through holes and the edge of said inner disc peripheral flange.

* * * * *